United States Patent
Grigorian et al.

(10) Patent No.: US 6,879,636 B2
(45) Date of Patent: Apr. 12, 2005

(54) ADAPTIVE FILTER FOR SUPPRESSING REPETITIVE HIGH-FREQUENCY INFORMATION IN A VIDEO DATA STREAM

(75) Inventors: Sam Grigorian, Fresno, CA (US); Yuiry Kamko, Clovis, CA (US)

(73) Assignee: Pelco Incorporated, Clovis, CA (US)

( * ) Notice: Subject to any disclaimer, the term of this patent is extended or adjusted under 35 U.S.C. 154(b) by 657 days.

(21) Appl. No.: 10/016,348

(22) Filed: Dec. 10, 2001

(65) Prior Publication Data

US 2003/0184683 A1 Oct. 2, 2003

(51) Int. Cl.[7] .................................................. H04N 7/12
(52) U.S. Cl. .................. 375/240.29; 382/199; 382/165; 348/627
(58) Field of Search .................... 375/240.29; 382/199, 382/165; 348/627, 663, 14.12

(56) References Cited

U.S. PATENT DOCUMENTS

| | | | |
|---|---|---|---|
| 4,138,694 A | | 2/1979 | Doi et al. |
| 4,302,708 A | | 11/1981 | Spilsbury |
| 4,553,176 A | | 11/1985 | Mendrala |
| 5,343,254 A | * | 8/1994 | Wada et al. ................ 348/627 |
| 5,424,784 A | * | 6/1995 | Raby .......................... 348/668 |
| 5,526,060 A | * | 6/1996 | Raby .......................... 348/663 |
| 5,617,135 A | * | 4/1997 | Noda et al. ............. 348/14.12 |
| 5,920,842 A | | 7/1999 | Cooper et al. |
| 6,026,217 A | | 2/2000 | Adiletta |
| 6,064,329 A | | 5/2000 | Byrd et al. |
| 6,081,750 A | | 6/2000 | Hoffberg et al. |
| 6,098,046 A | | 8/2000 | Cooper et al. |
| 6,157,749 A | | 12/2000 | Miyake |

OTHER PUBLICATIONS

Kreutz, "How to Design a Digital Video System for Any Application", Pelco Press Online, Fall 2001, vol. Eleven, No. three, pp. 18–19 (.pdf format), ftp://www.pelco.com/pelcopress/ppfall01.pdf.

Installation/Operation: PelcoNet™ Transmission System C1977M–C (7/01), pp. 1–92, ftp://www.pelco.com/Product-Manuals/C1977MC.PDF.

"Analog Devices: Ultralow Cost Video Codec", www.analog.com/pdf/ADV601LC_0.pdf.

* cited by examiner

Primary Examiner—Gims Philippe
(74) Attorney, Agent, or Firm—Michaelson & Associates; Peter L. Michaelson; Janet M. Skafar

(57) ABSTRACT

An image comprises pixels, and has repetitive high-frequency information. Decision circuitry identifies the repetitive high-frequency information in at least a subset of the pixels of the image to provide a repetitive-sequence signal. A low-pass filter filters the image to produce low-pass filtered pixels. A switch outputs the pixels of the image as adaptive-filter output, and in response to the repetitive-sequence signal, outputs the low-pass filtered pixels as the adaptive-filter output.

27 Claims, 11 Drawing Sheets

350

FOR EACH SCAN LINE:
　RESET A REPETITIVE-SEQUENCE FLAG;

FOR EACH INCOMING PIXEL IN A SCAN LINE:

IDENTIFY TRANSITIONS BETWEEN PIXEL VALUES IN A
　FIRST PREDETERMINED NUMBER OF ZONES;

IF EACH ZONE HAS ONE OR MORE TRANSITIONS, SET THE
　　REPETITIVE-SEQUENCE FLAG
　ELSE
　　RESET THE REPETITIVE-SEQUENCE FLAG;

IF THE REPETITIVE-SEQUENCE FLAG IS SET
　　OUTPUT AN UNMODIFIXED PIXEL VALUE
　ELSE
　　OUTPUT A LOW-PASS FILTERED PIXEL VALUE;

*FIG. 15*

ADAPTIVE FILTER FOR SUPPRESSING REPETITIVE HIGH-FREQUENCY INFORMATION IN A VIDEO DATA STREAM

BACKGROUND OF THE DISCLOSURE

1. Field of the Invention

The invention relates to image processing, and more particularly, to a method and apparatus for suppressing repetitive high-frequency information in a video data stream.

2. Description of the Prior Art

In video surveillance situations, it is oftentimes desirable to monitor a number of remote locations, such as entrances and exits of a building or stations along a production line, from a centralized monitoring location. For these situations, separate video cameras are stationed at each respective location to produce a view of the monitored location.

Video images are made of pixels arranged in a two-dimensional array. A pixel is a spot on a screen in a specified location which has luminance component that represents the brightness or darkness of the pixel. In color video images, the pixel also has information as to the color of that pixel in addition to the luminance information. The pixel information for a video image can be represented as digital information or data.

Video images may be transferred over a transmission medium, such as the Internet, for remote monitoring. Because the amount of data in a video image is large, it may take a long time to transfer the video image data.

The video image data can also be stored in a memory or on a disk in a video image file. The stored video image file may be retrieved later for subsequent viewing. Video image files use large amounts of storage space in the memory or disk.

Video image compression has been used to reduce the amount of data making up the video image. However, some images have a large amount of detail. Such detail is associated with a pixel sequence that has many large increases and decreases in the luminance of the pixel values in a short period of time, and will be referred to as high-frequency data or high-frequency portions of the image. The changes in the luminance of the pixel values may appear as edges or lines in the image. The high-frequency portion of the image may have repetitive and non-repetitive portions. For instance, a pattern may be repeated in a large part of the image. Such a repetitive pattern may occur when a person in the image is wearing a shirt with vertically oriented pin-stripes. The pin-stripes in the shirt have a large amount of repetitive high-frequency information. Even after compression, the region of the image having the repetitive high-frequency information can occupy a large portion of the data making up the video image.

One technique to reduce the amount of video image data applies a low pass filter to the entire image. However, applying the low pass filter to the entire image also affects any non-repetitive highly detailed portions of the image, in addition to the repetitive high-frequency portions. As a result, this technique tends to blur the image.

Therefore, a method and apparatus that suppresses the amount of repetitive high-frequency information in an image is needed. This method and apparatus should also preserve any non-repetitive highly detailed, that is, high-frequency, portions of the image.

SUMMARY OF THE INVENTION

These shortcomings and limitations are obviated in accordance with the present invention, by providing an adaptive filter that suppresses repetitive high-frequency information in an image. The image comprises pixels, and has repetitive high-frequency information. Decision circuitry identifies the repetitive high-frequency information in at least a subset of the pixels of the image to provide a repetitive-sequence signal. A low-pass filter filters the image to produce low-pass filtered pixels. A switch outputs the pixels of the image as adaptive-filter output, and in response to the repetitive-sequence signal, outputs the low-pass filtered pixels as the adaptive-filter output.

In another embodiment, the adaptive filter of the present invention is used in a video transmitter system. Alternately, the adaptive filter is used with a single image, such as from a digital still camera or a single frame of a video data stream. In yet another embodiment, a method for suppressing repetitive high-frequency information in an image is provided.

In this way, the present invention suppresses repetitive high-frequency information in an image while preserving the non-repetitive highly detailed portions of the image.

BRIEF DESCRIPTION OF THE DRAWINGS

The teachings of the present invention can be readily understood by considering the following detailed description in conjunction with the accompanying drawings, in which:

FIG. 15 is exemplary pseudo-code illustrating another embodiment of the adaptive filter module of the FIG. 13.

To facilitate understanding, identical reference numerals have been used, where possible, to designate identical elements that are common to some of the figures.

DETAILED DESCRIPTION

After considering the following description, those skilled in the art will clearly realize that the teachings of the present invention can be utilized in substantially any system that processes or stores video or still images. The invention can be readily incorporated into a video camera, a still camera, a video matrix switch or a multiplexor, integrated into a display, or a computer system. The invention can be used to send data directly from a video source to a display monitor. The invention can also be used in conjunction with a memory, such as semiconductor memory or a disk drive, that stores a digital representation of a video image, or with a video data stream. Nevertheless, to simplify the following discussion and facilitate reader understanding, the present invention will be described in the context of use of a video system having a video transmitter system that transmits a video data stream to a video receiver system.

Generally, the invention is an adaptive filter for suppressing repetitive high-frequencies in an image. More particularly, in one embodiment, the adaptive filter suppresses repetitive high frequencies from one or more images of a video data stream. The invention may be implemented in hardware, such as a field programmable gate array (FPGA), combinatorial logic, an application specific integrated circuit (ASIC), or in software as a program stored in a memory.

Figure 1:
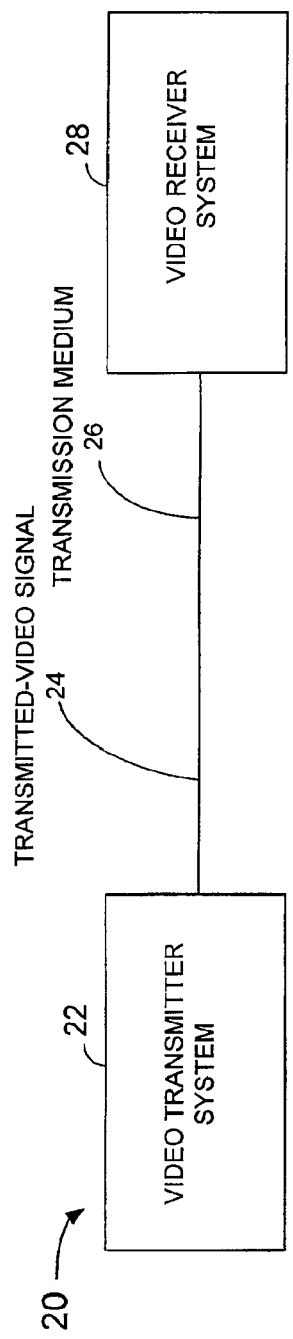
FIG. 1 is a high-level block diagram of an exemplary video surveillance system using the present invention.

FIG. 1 is a high-level block diagram of a video system 20 using the adaptive filter of the present invention. A video transmitter system 22 transmits a transmitted-video signal 24, that comprises a video signal that has been filtered using the adaptive filter of the present invention, over a transmission medium 26 to a video receiving system 28. The transmission medium 26 can be a local area network, wide area network, or the Internet. The transmission medium 26 may be implemented using coaxial cable, copper wire, radio, or optical fiber, or a combination thereof.

Figure 2:
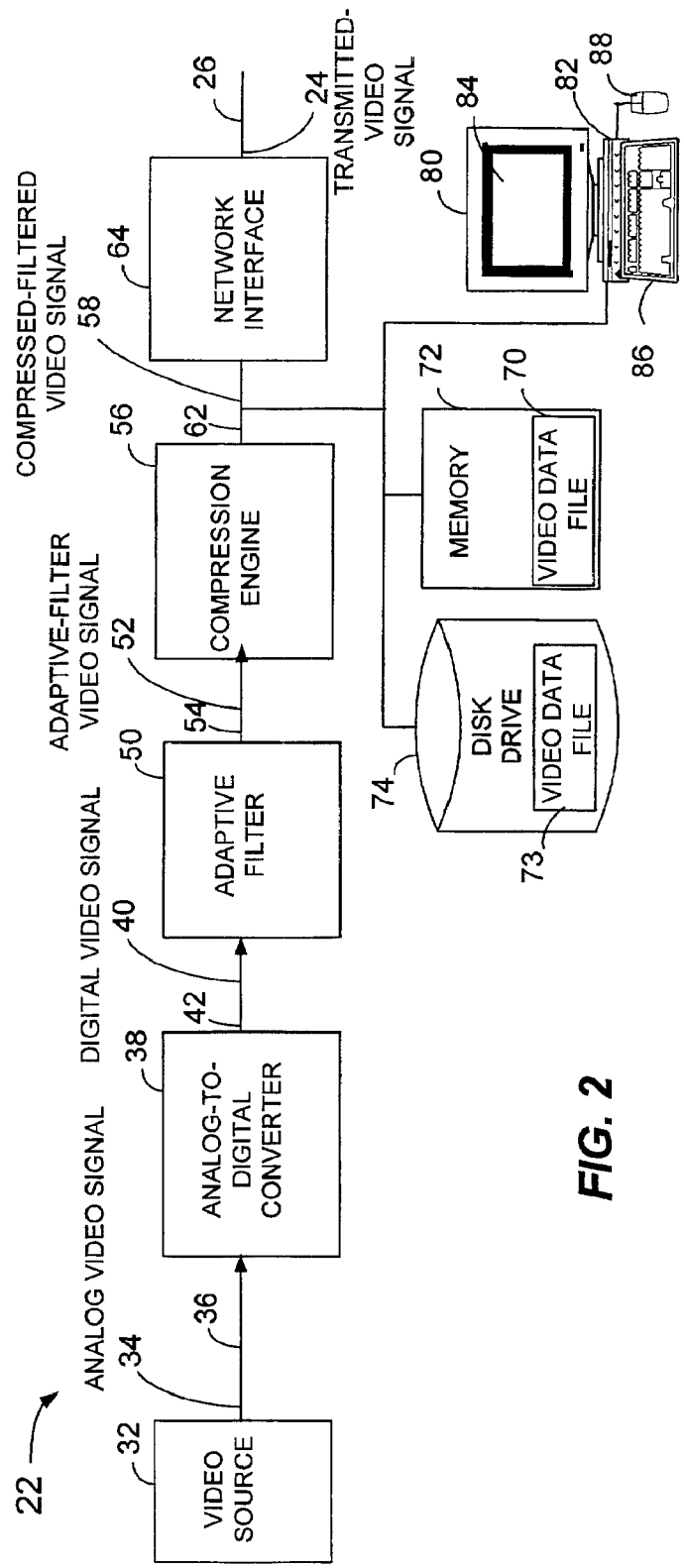
FIG. 2 is a block diagram of a video transmitter system of FIG. 1 using the adaptive filter of the present invention.

Referring to FIG. 2, a block diagram of the video transmitter system 22 of FIG. 1 is shown. A video source 32 such as a video camera or video tape recorder provides an analog video signal 34 on lead 36. The term "lead" refers to a connection having one or more conductors, for example, an eight-bit wide bus. An analog-to-digital converter 38 converts the analog video signal to a digital video signal 40 and outputs the digital video signal 40 on lead 42. Conversion of analog video signals to digital video signals is well-known and will not be further described. The digital video signal 40 has a stream of digital values (pixel values or pixel data) representing adjacent pixels in successive scan lines.

The adaptive filter 50 of the present invention receives the stream of digital values of the digital video signal 40, identifies a repetitive high-frequency sequence of digital values, and filters at least a portion of the digital values of the repetitive high-frequency sequence to output a stream of filtered digital values as an adaptive-filter signal 52 on lead 54, rather than the identified repetitive high-frequency sequence. In this way, low frequency and highly detailed non-repetitive portions of the image are preserved, and blurring is reduced.

A compression engine 56 receives the adaptive-filter video signal 52 and outputs a compressed-filtered video signal 58 on lead 62. The compression engine 56 may compress the adaptive-filter video signal 52 using any well-known compression technique, including, but not limited to, conditional or delta compression, and full frame compression such as wavelet, JPEG and J-MPEG compression. JPEG refers to the Joint Photographic Experts Group. MPEG refers to the Moving Picture Experts Group.

A network interface 64 formats the compressed-filtered video signal to provide the transmitted-video signal 24 on lead 26. The network interface 64 formats the compressed-filtered signal using an appropriate protocol, depending on the implementation, such as, for example, Internet protocol for transmission over the Internet. In this way, the amount of image data that is transmitted over the transmission medium 26 is reduced, thereby reducing the amount of time to transmit the image.

In another embodiment, the compressed-filtered video signal is stored, as a video data file 70 in the memory 72. Memory 72 is semiconductor memory. In another embodiment, the compressed-filtered video signal is stored, as a video data file 73, on a disk in a disk drive 74. The disk drive 74 includes, and is not limited to, a hard disk drive, optical disk drive and magneto-optical disk drive. In this way, the adaptive filter of the present invention reduces the size of the video data file and the amount of storage to store that file.

In another alternate embodiment, a computer system 80 is used to configure and control the operation of, and flow of image data from the compression engine 62, to the memory 72, the disk drive 74 and the network interface 64. The computer system 80 also has a processor 82, a display 84, a keyboard 86 and a mouse 88. In yet another alternate embodiment, the analog-to-digital converter 38, adaptive filter 50, compression engine 56, network interface 74, memory 72 and disk drive 74 are part of the computer system 80.

Figure 3:
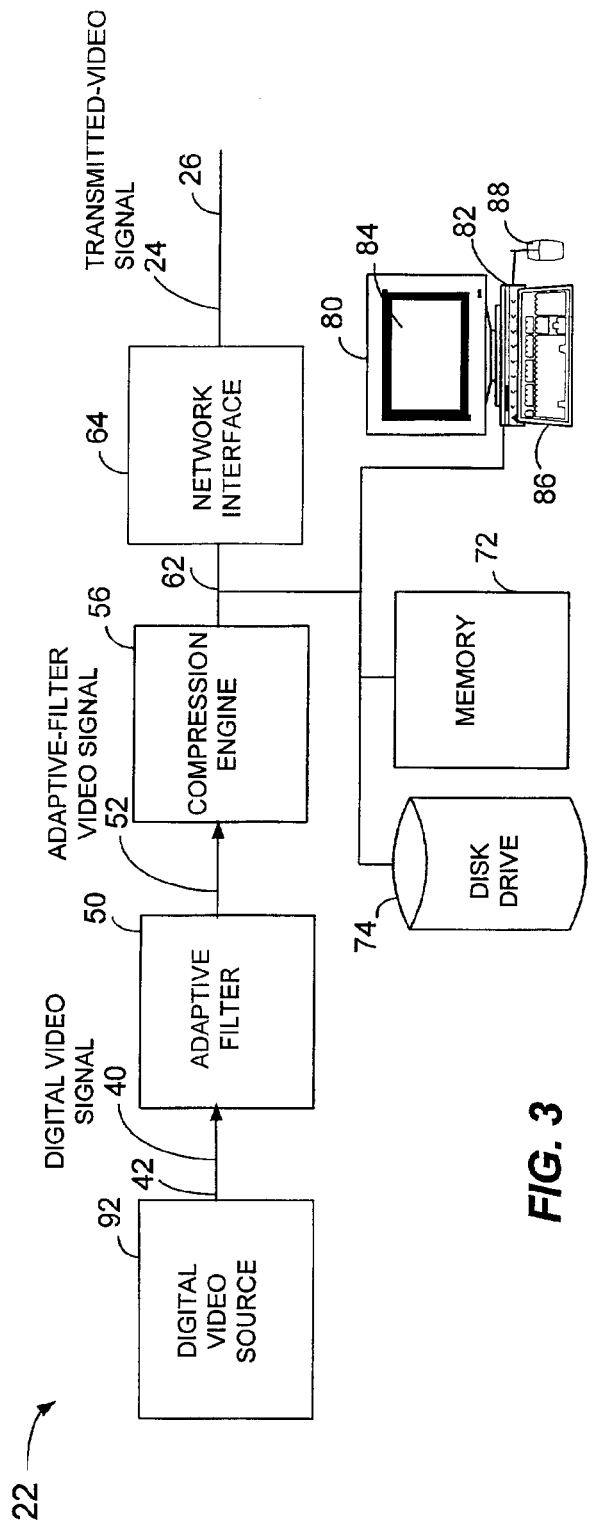
FIG. 3 is a block diagram of an alternate embodiment of the video transmitter system of FIG. 1 using the adaptive filter of the present invention.

Referring to FIG. 3, an alternate embodiment of the video transmitter system 22 of FIG. 1 is shown. In FIG. 3, a digital video source 92 provides the digital video signal 40 on lead 42 which is supplied to the adaptive filter 50. The digital video source 92 may be a digital video camera, digital still camera or DVD player. The other components of FIG. 3 are the same as in FIG. 2 and will not be further described.

Figure 4:
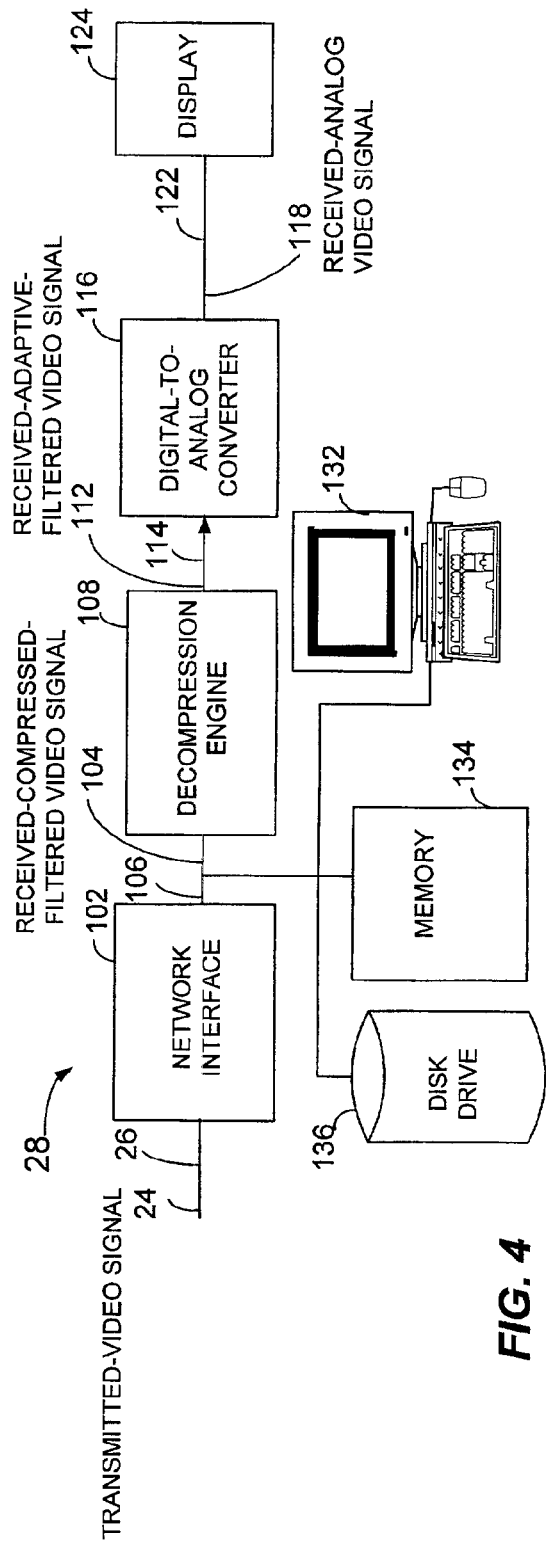
FIG. 4 is a block diagram of a video receiver system of FIG. 1.

FIG. 4 is a block diagram of the video receiver system 28 of FIG. 1. In the video receiver system 80, a network interface 102 receives the transmitted-video signal 24 from the transmission medium 26 and provides a received-compressed-filtered video signal 104 on lead 106 to a decompression engine 108 which decompresses the received-compressed-filtered video signal 104. The decompression engine 108 uses a decompression technique that is associated with the compression technique of the compression engine 56 of FIG. 2, to provide a received-adaptive-filtered video signal 112 on lead 114.

A digital-to-analog converter 116 converts the received-adaptive-filtered video signal 112 to a received-analog video signal 118 on lead 122 which is supplied to a display monitor 124. The display monitor 124 displays the filtered image.

In another alternate embodiment, a control processor computer 132 is coupled to the network interface 102, decompression engine 108, memory 134 and disk drive 136. A user can operate the control processor computer 132 to send commands to control the flow of the received-compressed-filtered video signal. In particular, the control processor 132 can cause the received-compressed-filtered video signal 104 to be stored in the memory 134, a semiconductor memory. Alternately, the control processor computer 132 can cause the received-compressed-filtered video signal 104 to be stored in the disk drive 136 in the video receiver system 28. The disk drive 136 may be a hard disk drive, optical, or magneto-optical disk drive.

Figure 5:
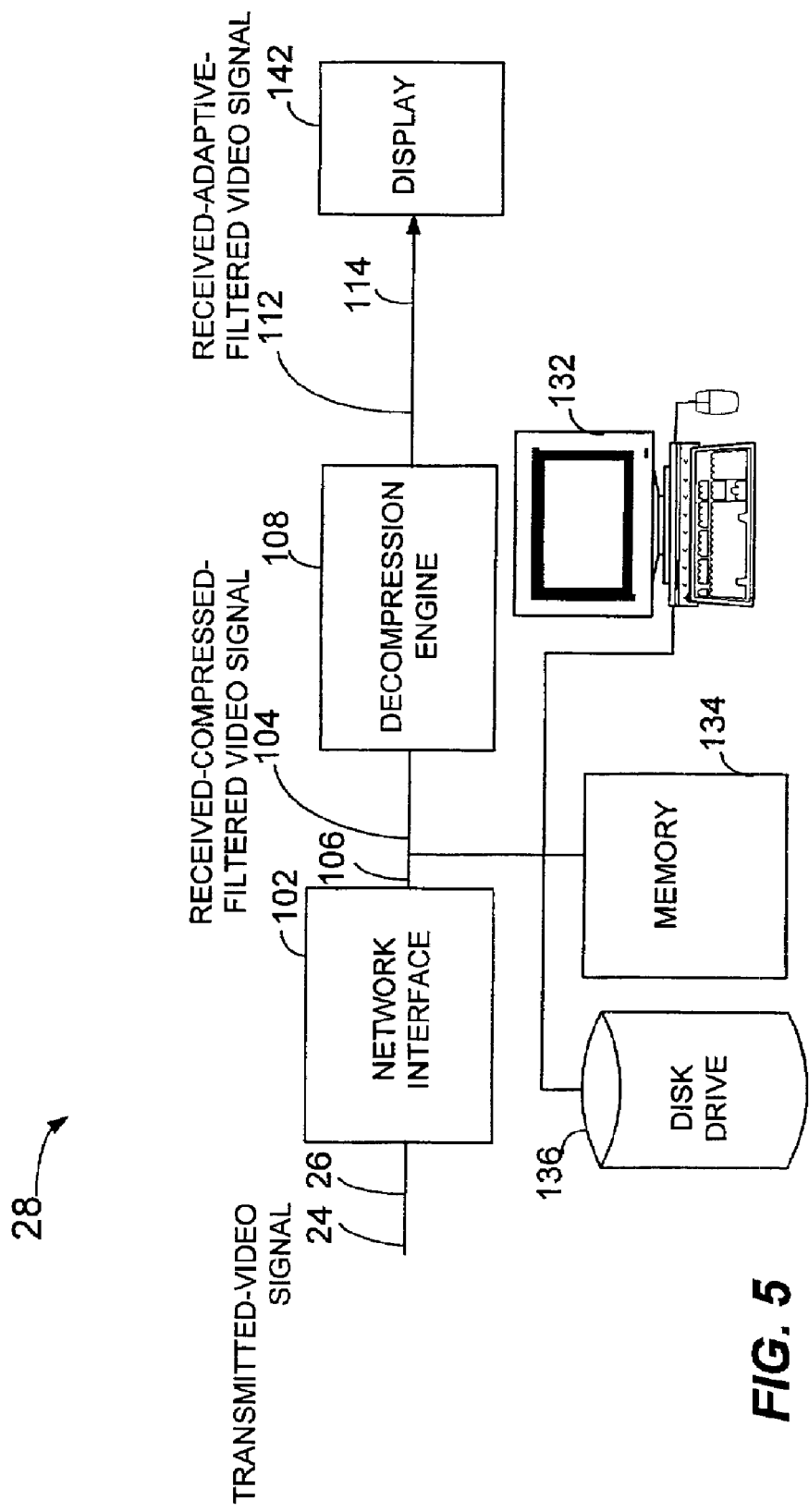
FIG. 5 is a block diagram of an alternate embodiment of the video receiver system of FIG. 1.

FIG. 5 is a block diagram of an alternate embodiment of the video receiver system 28 of FIG. 1. In FIG. 5, the received-adaptive-filtered video signal 112 is supplied directly to a digital display 142.

In an alternate embodiment, any one or a combination of the disk drive 136, memory 134, network interface 102, decompression engine 108, digital-to-analog converter 116, and display 124, 142 are part of the control processor computer 132.

Figure 6:
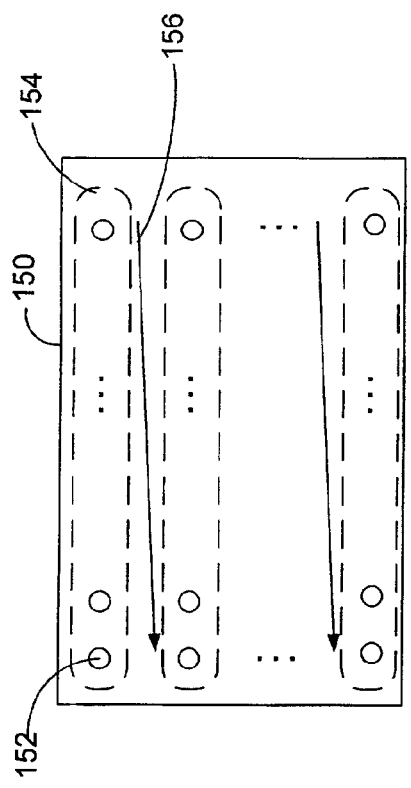
FIG. 6 illustrates a frame of an image on the exemplary displays of FIGS. 4 and 5.

FIG. 6 depicts an exemplary frame 150 of the digital video signal that is displayed on the display 124 of FIG. 4, or in an alternate embodiment, the display 142 of FIG. 5. The frame 150 has an array of pixels 152 arranged horizontally and vertically in rows and columns, respectively. A row of pixels is referred to as a scan line 154, as indicated by the dashed rounded-rectangle enclosing the row of pixels. The lines having an arrow 156 indicate the end of one scan line and the beginning of a new scan line. The video sources 32 (FIG. 1) and 92 (FIG. 2) transmit and the displays 124 (FIG. 4) and 142 (FIG. 5) display the pixels in scan lines.

In an alternate embodiment, the exemplary frame 150 is a single frame, such as from a still digital camera.

In a black-and-white display, the luminance of each pixel 152 is represented as an eight-bit grayscale value, typically ranging from 0 to 255. Black is associated with a grayscale value of 0; and white is associated with a grayscale value of 255. Intermediate shades of gray have values from 1 to 254.

In another embodiment, the adaptive filter is used with a color video signal that has a color information component and a luminance component. The adaptive filter filters the luminance component of the color video signal. Typically, an eight bit value is used to represent the luminance component. For simplicity, the invention will be described with respect to grayscale values.

Figure 7:
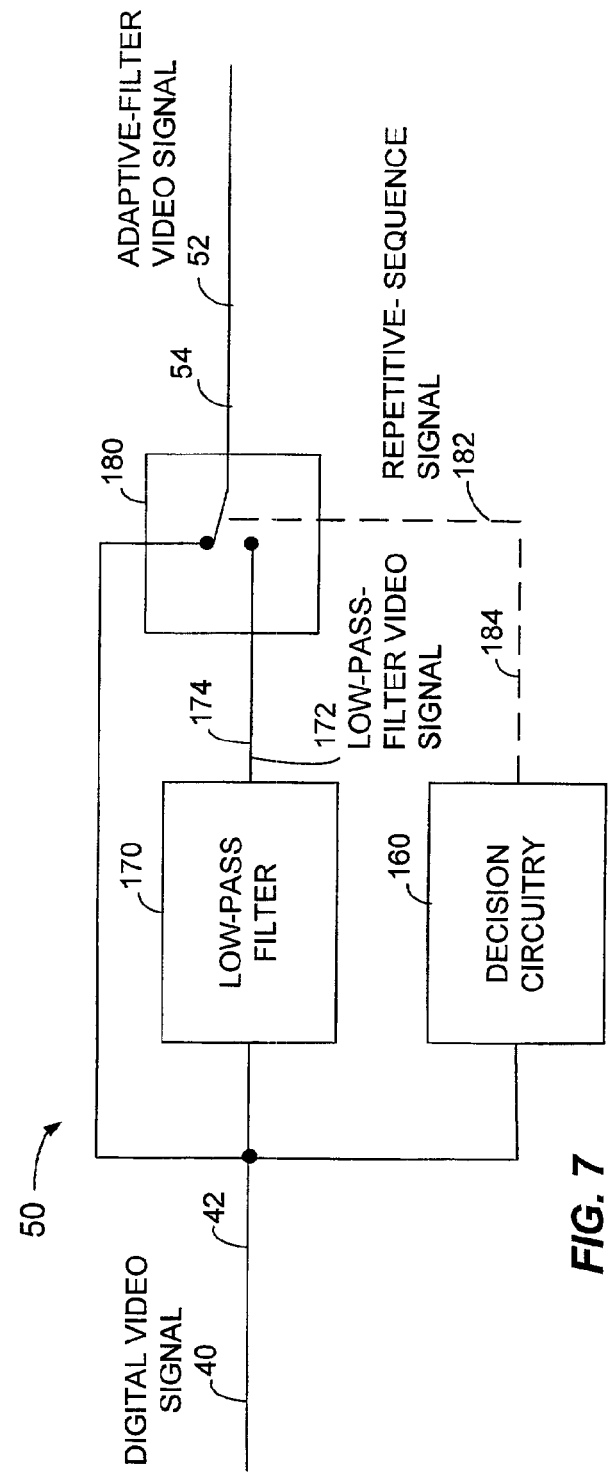
FIG. 7 is a block diagram of an embodiment of the adaptive filter of FIGS. 2 and 3.

Referring now to FIG. 7, a block diagram of the adaptive filter 50 of the present invention is shown. The digital video signal 40 is supplied, via lead 42, to decision circuitry 160, a low-pass filter 170, and a switch 180. The low-pass filter 170 is applied to the pixel values in the digital video signal to produce a low-pass-filter video signal 172 on lead 174.

At each new scan line, the decision circuitry 160 deactivates a repetitive-sequence signal 182 on lead 184 which causes the switch 180 to output the pixel values of the digital video signal 40, unmodified, as the adaptive-filter video signal 52 on lead 54. When the decision circuitry 160 detects a region of repetitive high-frequency data in the digital video signal 40, the decision circuitry 160 activates the repetitive-sequence signal 182 on lead 184. In response to the activated repetitive-sequence signal 182, the switch 180 outputs the low-pass-filter video signal 172. The decision circuitry 160 deactivates the repetitive-sequence signal 182 when repetitive high-frequency data is no longer detected in the digital video signal 40, and the switch 180 will then output the unmodified digital video signal as the adaptive-filter video signal 52 on lead 54. In this way, repetitive high-frequency detail is suppressed, while preserving non-repetitive high-frequency and low-frequency portions of the image.

Figure 8:
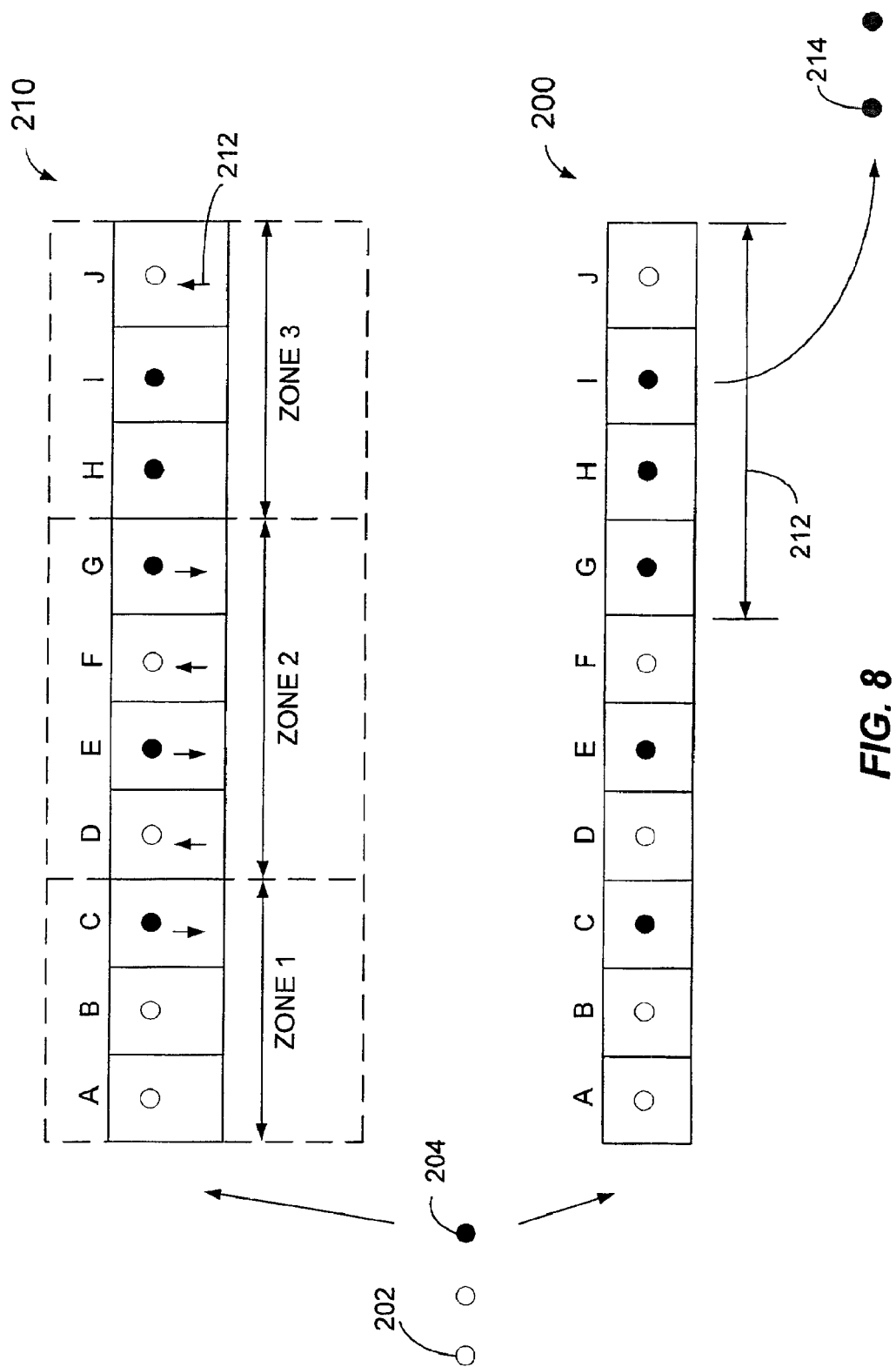
FIG. 8 illustrates an exemplary sequence of repetitive high-frequency data from an image and a result of filtering using the adaptive filter of FIG. 7.

Referring also to FIG. 8, the operation of the adaptive filter of FIG. 7 will now be described. In FIG. 8, an exemplary digital video signal has a stream of repetitive high-frequency pixel data. Each circle represents a pixel. The luminance, or greyscale, values of incoming pixels are stored in a low-pass filter shift-register 200. The pixels are labeled A through J. Pixel A is the most recently received pixel, and pixel J was received prior to pixel A. A white pixel 202, having a greyscale value of 255, is unshaded. A black pixel 204, having a greyscale value of zero is shaded.

A transition shift register 210 indicates whether a transition 210 occurred between pixels. A difference in the luminance or greyscale values between two pixels is determined. A transition is indicated when the absolute value of that difference is greater than or equal to a predetermined transition value, and when the sign of that difference is different from the sign of the difference for previous transition. Transitions are determined between adjacent pixels in the same scan line. In one embodiment, the predetermined transition value is equal to fifteen. However, the predetermined transition value is not limited to a value of fifteen and may be selected in accordance with a desired amount of filtering. The arrows indicate a transition. For example, pixel J has an arrow 212 that indicates that a transition occurred between pixels J and I, because the value of the difference in greyscale values between pixels J and I is equal to 255, and the sign of that difference changed from the sign of the previous transition. A transition may have a positive sign which is indicated with an upward pointing arrow. For example, the transition associated with pixel J 212 has a positive sign. Alternately a transition may have a negative sign which is indicated by a downward pointing arrow. For example, the transition associated with pixel G is negative. In another example, assume that the sign of the previous transition was negative, and the current pixel has a luminance value equal to twenty and a new pixel has a luminance value equal to forty. A transition will be indicated because the difference between twenty and forty is equal to twenty which is greater than fifteen with a positive sign, and the previous transition had a negative sign. If another pixel with a luminance value equal to sixty arrives, the difference between sixty and forty is equal to twenty; however, the sign of the difference did not change from the sign of the previous transition, therefore no transition will be indicated. A transition is evaluated when a pixel enters the low-pass filter shift register 200.

The transition shift register 210 is divided into a predetermined number of zones. The embodiment shown in FIG. 8 has three zones—Zones 1, 2 and 3. When each zone has one or more transitions, the repetitive-sequence signal is activated. When any zone has no transitions, the repetitive-sequence signal is deactivated. For the exemplary pixel data of FIG. 8, the repetitive-sequence signal is active because each zone has one or more transitions.

Alternately, any number of zones, can be used. In an alternate embodiment one zone is used. In another alternate embodiment, two zones are used. In yet another alternate embodiment four zones are used. The number of zones can be chosen depending on the desired filtering. In addition, the number of bits per zone is not limited to three or four, but is chosen depending on the desired filtering. In another alternate embodiment, the number of transitions per zone to activate the repetitive-sequence signal is not limited to one, but is equal to two, or alternately greater than two depending on the desired filtering.

In the low-pass filter 170 of FIG. 7, the low-pass filter shift register 200 shifts the greyscale values of the sequence of pixels when a new pixel value is received. In FIG. 8, since the repetitive-sequence signal is active, the switch 180 (FIG. 7) outputs the low-pass filter signal 172 as the adaptive-filter video signal 52. In one embodiment, the low-pass filter signal 172 is an average of a group of neighboring pixels 212. For example, rather than outputting pixel I, the average of pixels G, H, I and J, which is equal to sixty-three, is output by the low-pass filter 170 and the switch 180, as indicated by the shaded pixel 214.

In an alternate embodiment, for color video, the low-pass filter shift register 200 stores the luminance values, rather than the greyscale values, and the luminance values are averaged.

Figure 9:
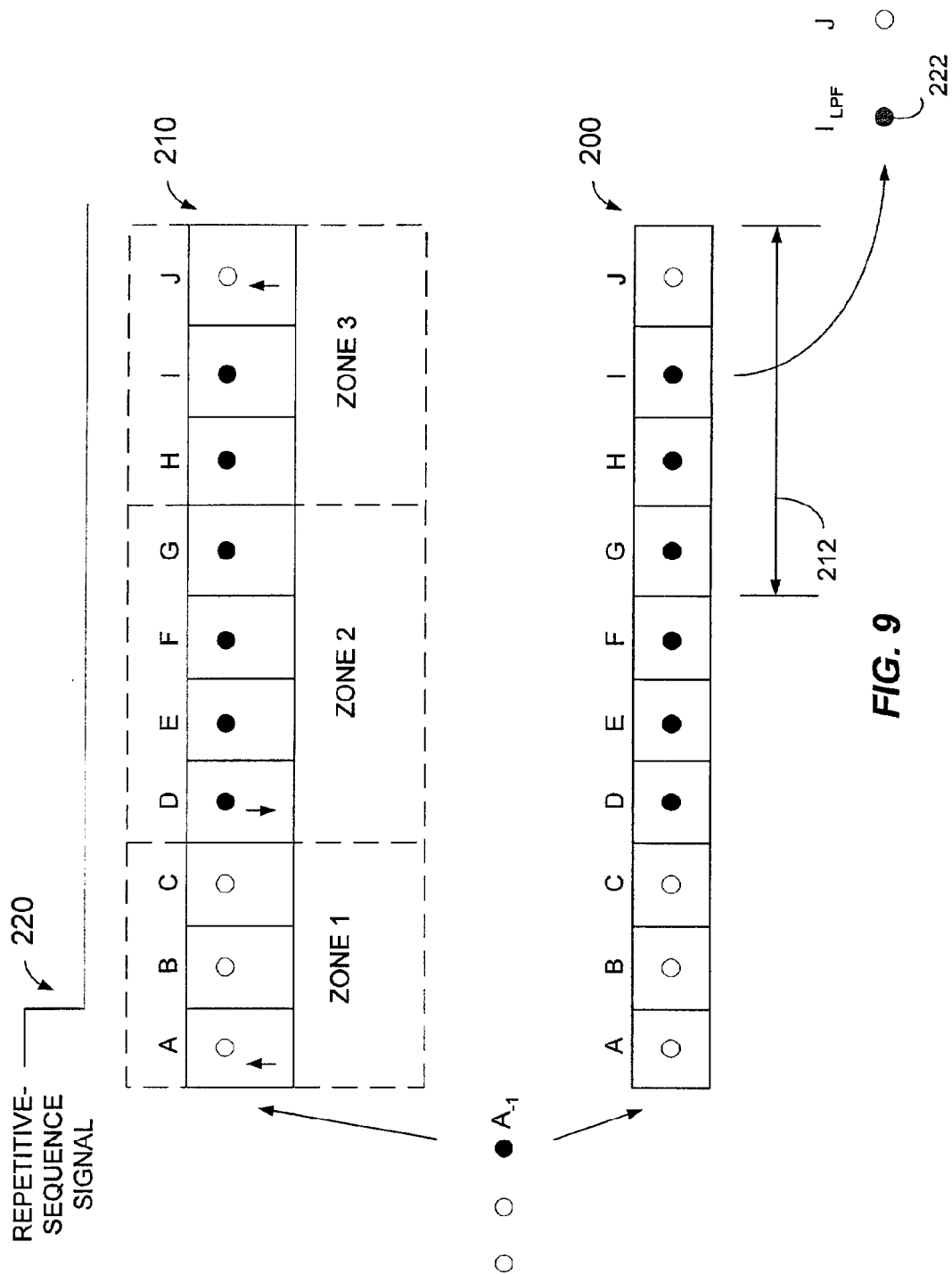
FIG. 9 illustrates one embodiment of the timing of the repetitive-sequence signal of FIG. 7 using another exemplary sequence of repetitive high-frequency data.

FIG. 9 is another exemplary pixel sequence which illustrates the timing of the activation of the repetitive-sequence signal. Initially, such as at the beginning of a scan line, the repetitive-sequence signal is deactivated. When pixel A and the next pixel $A_{-1}$ arrive, a transition for pixel A is indicated, the values in the transition shift register 210 the low-pass filter shift register 200 are shifted right. A value representing that a transition occurred for pixel A is stored in the transition shift register 210. The value of pixel $A_{-1}$ is stored in the low-pass filter shift register 200. In particular, the greyscale value of pixel $A_{-1}$ is stored in the low-pass filter shift register 200. When the transition for pixel A is stored in the transition shift register 210, all three zones will have one transition and the repetitive-sequence signal is activated 220.

The switch 180 outputs the greyscale value of pixel J, 255. Because the repetitive-sequence signal was activated when the switch was to output either the grayscale value of pixel I or the average of the grayscale values of pixels neighboring pixel I 212, the switch 180 outputs that average, equal to sixty-three, rather than the greyscale value of the pixel I (zero), as indicated by the shaded pixel 222 labeled $I_{LPF}$.

Figure 10:
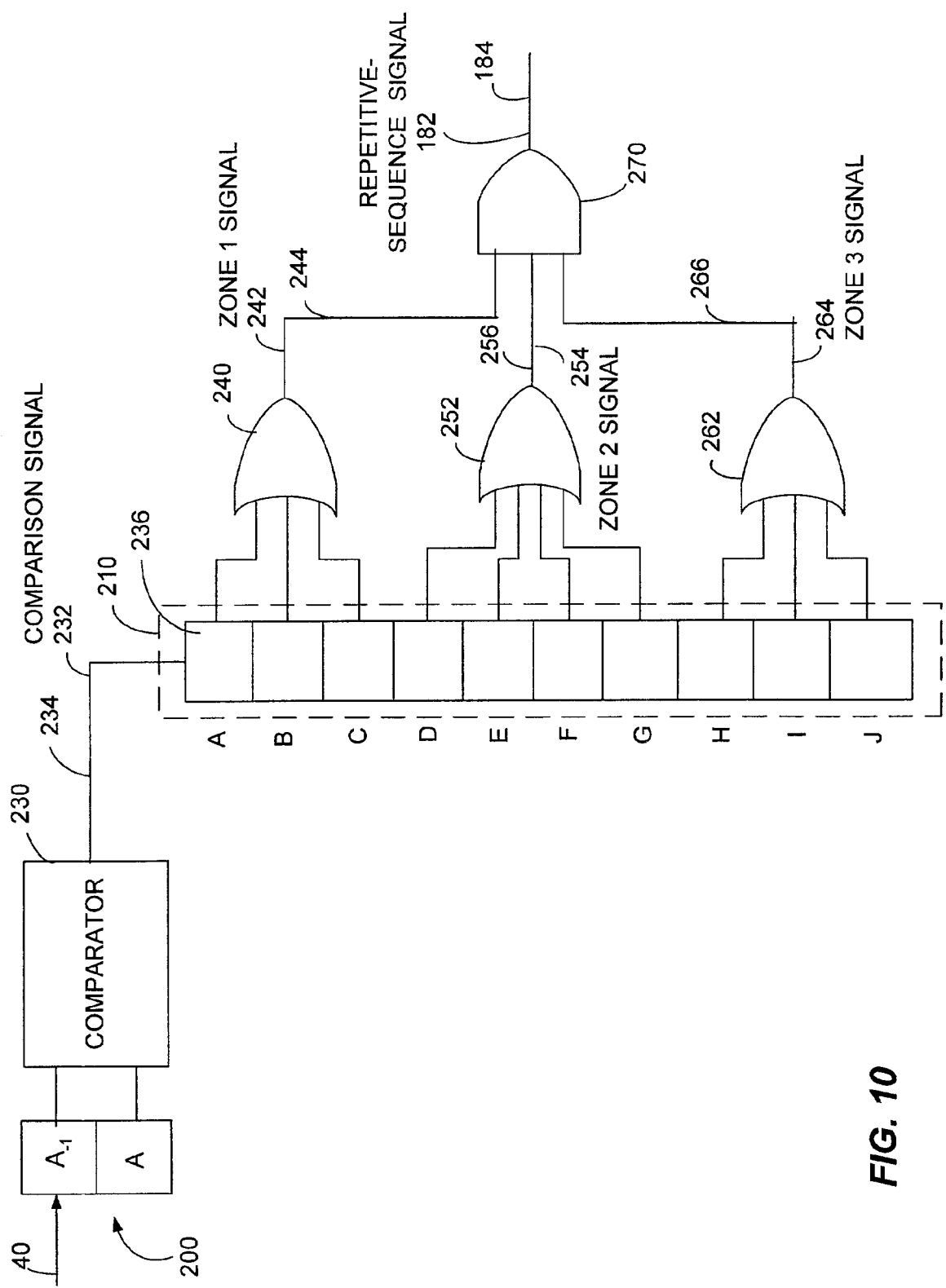
FIG. 10 is a circuit diagram of the decision circuitry of FIG. 7 in accordance with an embodiment of the present invention.

FIG. 10 is a circuit diagram of one embodiment of the decision circuitry 160 (FIG. 7). A portion of the low-pass filter shift register 200 stores the greyscale values of the two most recently arrived incoming pixels, A and $A_{-1}$, of the digital video signal 40. A comparison circuit 230 compares the greyscale values stored in the pixel register 200 and outputs a comparison signal 232. The comparison signal 232 is a digital "one" when a transition is indicated, and is a digital "zero" otherwise. The comparison signal 232 is supplied to the transition shift register 210 on lead 234, and is stored as a bit 236 in that register 210. When another new pixel arrives in the low-pass filter shift register 200, the transition shift register 210 shifts and loads the new value of the comparison signal 232. The output of the transition shift register 210 is divided into zones. A zone 1 OR gate 240 performs an OR operation of the bit values of the comparison signals stored in the first three bits of the transition shift register 210 to provide a zone 1 signal 242 on lead 244 that indicates whether one or more transitions have occurred in zone 1. A zone 2 OR gate 252 performs an OR operation of the bit values of the comparison signals stored in the next four bits of the transition shift register 210 to provide a zone 2 signal 254 on lead 256 that indicates whether one or more transitions have occurred in zone 2. A zone 3 OR gate 262 performs an OR operation of the bit values of the comparison signals stored in the next three bits of the transition shift register 210 to provide a zone 3 signal 264 on lead 266 that indicates whether one or more transitions have occurred in zone 3.

An AND gate 270 generates the repetitive-sequence signal 182 on lead 184 by performing an AND operation of the zone 1 (242), zone 2 (254) and zone 3 (264) signals.

Figure 11:
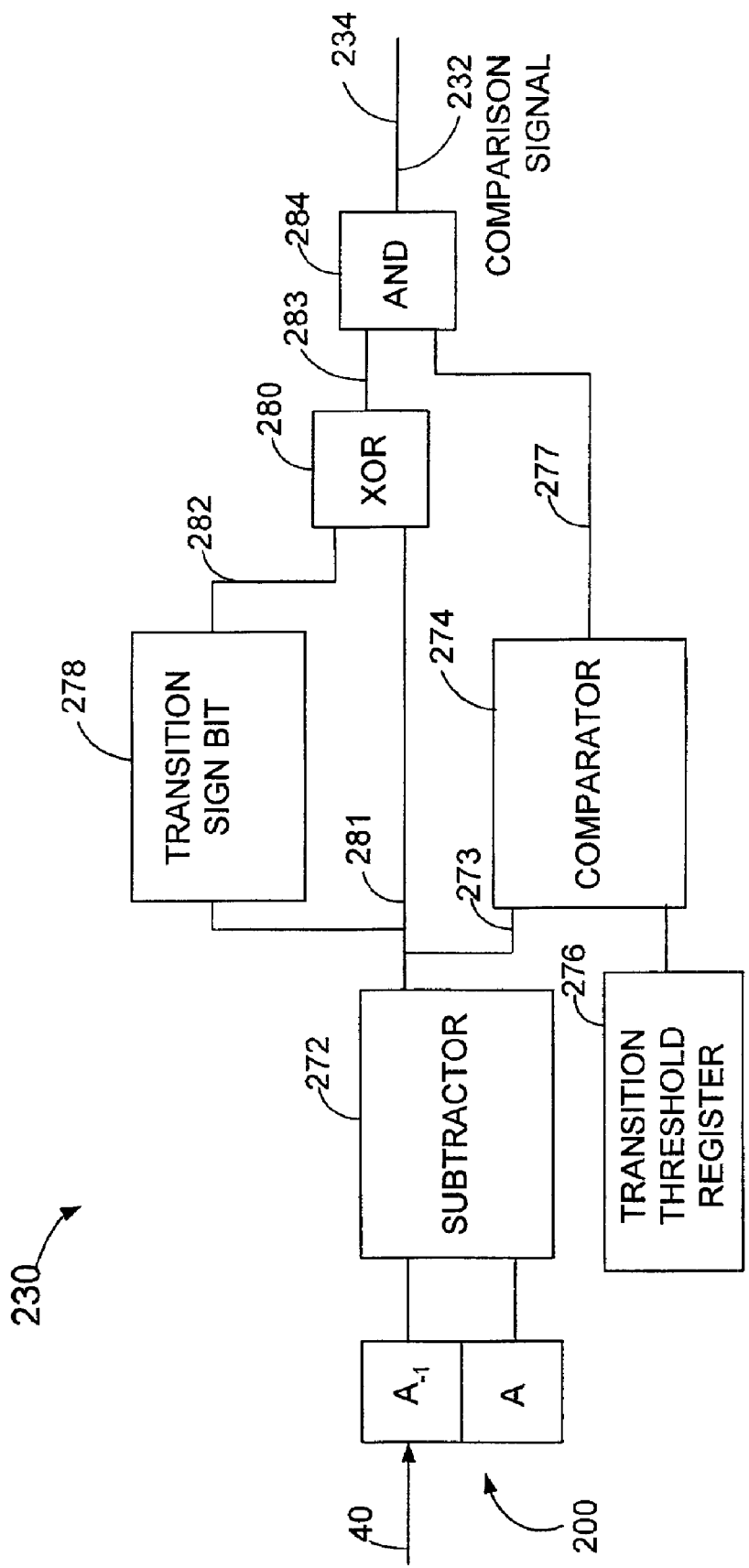
FIG. 11 is a circuit diagram of a comparison circuit of the decision circuitry of FIG. 10 in accordance with an embodiment of the present invention.

FIG. 11 is a circuit diagram of an embodiment of the comparison circuit 230 of FIG. 10. A portion of the low-pass filter shift register 200 provides the greyscale values of the two most recently arrived incoming pixels, A and $A_{-1}$, of the digital video signal 40 to the comparison circuit 230. In the comparison circuit 230, a subtractor 272 determines the difference between pixels A and $A_{-1}$, and outputs that difference on lead 273 to the comparator 274. The comparator 274 compares the difference to a value stored in a transition threshold register 276 and outputs a meet-or-exceeds signal, as a digital one, on lead 277 if the difference is greater than or equal to the value in the transition threshold register 276; otherwise the meet-or-exceeds signal is a digital zero.

A transition sign bit register 278 stores the sign of a previous transition. An exclusive OR gate (XOR) 280 compares the sign of the difference on lead 281 to the sign of previous transition stored in the transition sign bit register 278 on lead 282. If the signs are the same, the exclusive OR gate 280 outputs a sign-change signal as a digital zero on lead 283. If the signs are different, the exclusive OR gate 280 outputs the sign-change signal as a digital one on lead 283. An AND gate 284 performs an AND operation between the sign-change signal on lead 283 and the meet-or-exceeds signal on lead 277 to generate the comparison signal 232 on lead 234 to indicate that a transition has occurred.

The value of the sign of the difference that is output by the subtractor 272 is stored in the transition sign bit register 278 when the comparison signal indicates that a transition has occurred.

Figure 12:
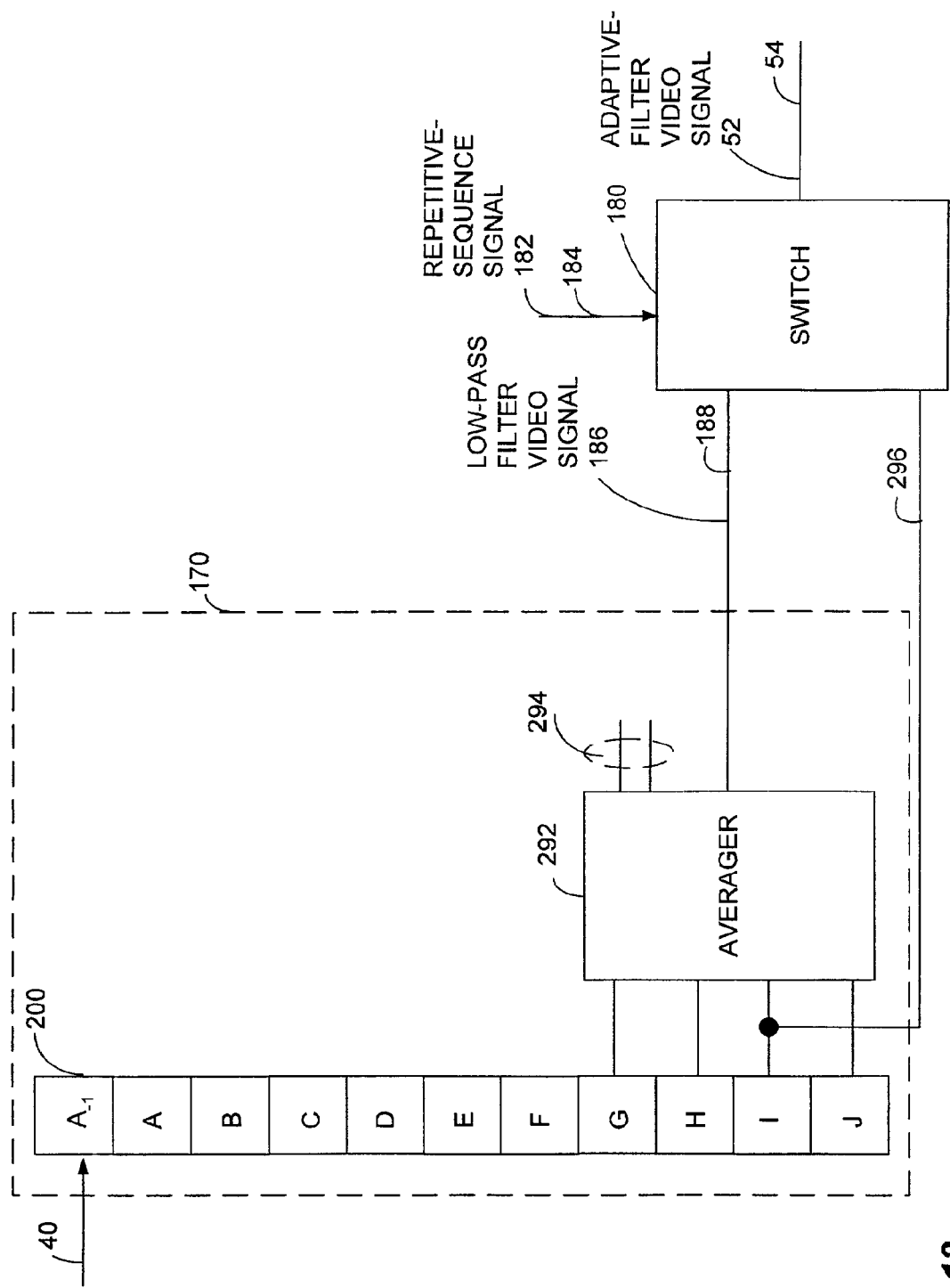
FIG. 12 is a circuit diagram of the low-pass filter of FIG. 7 in accordance with an embodiment of the present invention.

FIG. 12 is a circuit diagram of the low-pass filter 170 and switch 180 of FIG. 7. The low-pass filter shift register 200 stores the pixel values as described above. In this embodiment, the low-pass filter shift register 200 also stores the value of pixel $A_{-1}$, and supplies the values of pixels A and $A_{-1}$ to the comparison circuit 230 of FIGS. 10 and 11. During operation, the value of pixels A through J that are stored in the low-pass filter shift register 200 correspond to the values of the transitions of pixels A through J stored in the transition register 210 (FIG. 10), respectively. An averager 292 adds the values of the G, H, I and J pixels. The two least significant bits 294 of the output of the averager 292 are not supplied to the switch 180, which effectively divides the output of the averager 292 by four to provide the average as the low-pass filter video signal 186 on lead 188. More generally, in another alternate embodiment, the averager 292 sums a predetermined number of values from the low-pass filter shift register 200, and a number of least significant bits equal to the predetermined number of values are effectively dropped. In one embodiment, the low-pass filter video signal 186 has 8-bits.

The switch 180 receives the low-pass filter video signal 186 from the averager 292, and receives the corresponding unmodified pixel value of pixel I on lead 296. In response to the repetitive-sequence signal 182, the switch 180 outputs either the low-pass filter signal 186 or the unmodified value of pixel I as the adaptive-filter video signal 52 on lead 54.

The size of the transition and low-pass filter registers is not meant to be limited to ten bits. In an alternate embodiment, these registers store more than ten bits. In another alternate embodiment, these registers store at least two but less than ten bits.

In yet another alternate embodiment, the decision maker can be implemented using an analog or digital high-pass filter to produce the repetitive-sequence signal. The high-pass filter passes portions of the analog video signal that exceed a predetermined high-pass threshold frequency. The repetitive-sequence signal is activated or deactivated based on an amount of energy of the analog video signal passing through the high pass filter over a predetermined period of time.

In another alternate embodiment, the averager 292 is implemented by adding a predetermined number of pixel values from the low-pass filter shift register 200 to produce a sum, then shifting the sum by a number equal to the predetermined number of pixel values to drop that number of least significant bits to provide an average.

Figures 13, 14:
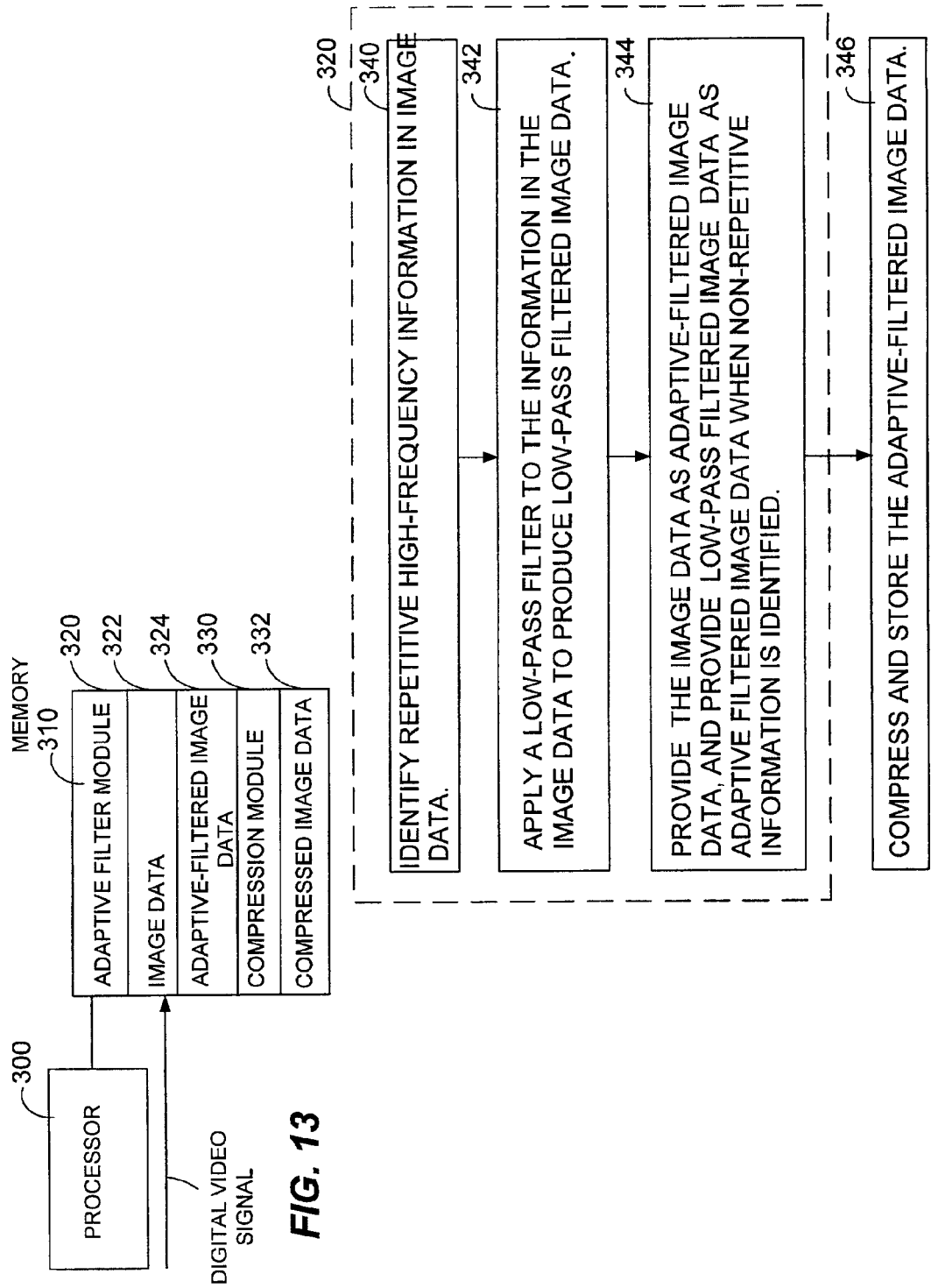
FIG. 13 is a block diagram of the adaptive filter of FIG. 2 in an alternate embodiment of the present invention.
FIG. 14 is a flowchart depicting an embodiment of the operation of an adaptive filter module of FIG. 13.

FIG. 13 illustrates a software embodiment of the adaptive filter 50 (FIG. 2) of the present invention. A processor 300 executes instructions stored in a memory 310. The memory 310 stores an adaptive filter module 320 which has instructions that implement the adaptive filter. The memory 310 also receives image(s), such as the digital video signal, and stores that image as image data 322. The adaptive filter module 320 stores the adaptive-filtered image data 324 in the memory 310. A compression module 330 has instructions to compress image data, and more particularly, to compress the adaptive-filtered image data 324 and store that compressed data as compressed image data 332.

FIG. 14 is a flowchart of the adaptive filter module 320 of FIG. 13. In step 340, repetitive high-frequency data is identified in image data, either video or still image data depending on the embodiment.

In step 342, a low-pass filter is applied to the image data to produce low-pass-filtered image data. The low-pass filter may be a moving average filter as described above with respect to FIG. 8. Alternately, the low-pass filter may be any type of low-pass filter.

In step 344, the image data is output as the adaptive-filtered image data until repetitive high-frequency data is identified, then the low-pass-filtered image data is output as the adaptive-filtered video data until repetitive high-frequency data is no longer identified. Alternately, the adaptive filter module 320 stores the adaptive-filtered image data 324 in the memory 310 of FIG. 13.

In step 346, the compression module 330 of FIG. 13 compresses the adaptive-filtered image data 324 and stores the compressed adaptive-filtered image data as compressed image data 332 in memory 310. In an alternate embodiment, the compression module 330 is not used.

FIG. 15 is exemplary pseudo-code 350 illustrating another embodiment of the operation of the adaptive-filter module of FIG. 13.

In this way, repetitive high-frequency data in an image is suppressed, and the amount of data representing that image, even after compression, is further reduced.

Although various embodiments, each of which incorporates the teachings of the present invention, have been shown and described in detail herein, those skilled in the art can readily devise many other embodiments that still utilize these teachings.

What is claimed is:

1. An adaptive filter to suppress repetitive high-frequency information in an image comprising pixels, the image having repetitive high-frequency information, comprising:
   decision circuitry to identify the repetitive high-frequency information in at least a subset of the pixels of the image to provide a repetitive-sequence signal;
   a low-pass filter to filter the image to produce low-pass filtered pixels; and
   a switch to output the pixels of the image as adaptive-filter output, and in response to the repetitive-sequence signal, to output the low-pass filtered pixels as the adaptive-filter output.

2. The adaptive filter of claim 1 wherein the low-pass filter filters the pixels of the image by averaging a predetermined number of pixels.

3. The adaptive filter of claim 1 wherein the decision circuitry disables the repetitive-sequence signal at the beginning of a scan line.

4. The adaptive filter of claim 1 wherein a transition has a sign, and a transition is indicated when a difference in luminance between two pixels exceeds a predetermined transition value and that difference has a sign that is different from the sign of a previous transition value, and the decision circuitry identifies a repetitive sequence when at least a predetermined number transitions occur in a sequence of pixels having a predetermined number of pixels.

5. The adaptive filter of claim 1, wherein a transition has a sign, and a transition is indicated when a difference in luminance between two adjacent pixels exceeds a predetermined transition value and a sign of that difference is different from the sign of a previous transition value, and a sequence of pixels is associated with a respective sequence of transitions, the sequence of transitions having a predetermined number of zones, and the decision circuitry activates the repetitive-sequence signal when each zone has one or more transitions.

6. The adaptive filter of claim 5 wherein the decision circuitry deactivates the repetitive-sequence signal when one or more zones have no transitions.

7. The adaptive filter of claim 1 wherein the image is a video image.

8. A video transmitter system comprising:
   an adaptive filter to suppress at least a portion of repetitive high-frequency information from a video signal to provide an adaptive-filter video signal;
   a compression engine to compress the adaptive-filter video signal to provide a compressed video signal; and
   a network interface to transmit the compressed video signal over a transmission medium.

9. The video transmitter system of claim 8 wherein the adaptive filter comprises:
   decision circuitry to identify the repetitive high-frequency information in the video signal to provide a repetitive-sequence signal;
   a low-pass filter to filter the video signal to produce a low-pass filtered video signal; and
   a switch to output the video signal as the adaptive filter video signal, and in response to the repetitive-sequence signal, to output the low-pass filtered video signal as the adaptive-filter video signal.

10. The video transmitter system of claim 9 wherein the video signal is a digital video signal comprising pixel values, and the low-pass filter filters the digital video signal by averaging a first predetermined number of pixel values.

11. The video transmitter system of claim 9 wherein the decision circuitry is reset to disable the repetitive-sequence signal at the beginning of each scan line.

12. The video transmitter system of claim 9 wherein a transition has a sign, and the decision circuitry indicates a transition when a difference in luminance between two pixels exceeds a predetermined transition value and the sign of that difference is different from the sign of a previous transition, and activates the repetitive-sequence signal when at least a predetermined number of transitions occur in a sequence of pixels having a predetermined number of pixels.

13. A method for suppressing repetitive high-frequency information in a video image having repetitive high-frequency information, the video image having pixels represented as video image data, comprising:
   identifying repetitive high-frequency information in the video image data;
   low-pass filtering the video image data to produce low-pass filtered video image data; and
   when the repetitive high-frequency information is identified, outputting the low-pass filtered video image data as adaptive-filter image data, otherwise outputting the unmodified video image data as the adaptive-filter image data.

14. The method of claim 13 wherein the video image data comprises grayscale values; and wherein said low-pass filtering averages a subset of the grayscale values to produce at least a subset of the adaptive filter image data.

15. The method of claim 13 wherein the video image data is color video data having an luminance component and a color component; and wherein said low-pass filtering modifies a subset of luminance components to produce at least a subset of the adaptive-filter image data.

16. The method of claim 13 wherein said identifying identifies repetitive high-frequency information in the video image when a difference in luminance between two pixels is greater than or equal to a predetermined threshold for a predetermined number of pixels.

17. The method of claim 13 wherein said identifying identifies non-repetitive information, and further comprising:

passing the video image data when repetitive high-frequency information is not identified.

18. The method of claim 13 wherein a transition has a sign and said identifying identifies a transition when a difference in luminance between two pixels exceeds a predetermined transition value and the sign of that difference is different from the sign of a previous transition, and identifies a repetitive sequence when at least a predetermined number transitions occur in a sequence of pixels having a predetermined number of pixels.

19. The method of claim 13 wherein a transition has a sign, and said identifying identifies a transition a difference in luminance between two adjacent pixels exceeds a predetermined transition value and a sign of that difference is different from a sign of a previous transition, and a sequence of pixels is associated with a respective sequence of transitions, the sequence of transitions having a predetermined number of zones, and said identifying identifies the high-frequency repetitive information when each zone has one or more transitions.

20. The method of claim 19 wherein said identifying does not identify repetitive high-frequency information when one or more zones have no transitions.

21. An adaptive filter to suppress repetitive high-frequency information in an image comprising pixels, the image having repetitive high-frequency information, comprising:

means for identifying the repetitive high-frequency information in at least a subset of the pixels of the image to provide a repetitive-sequence signal;

means for filtering the image to produce low-pass filtered pixels; and means for outputting the pixels of the image as adaptive-filter output, and in response to the repetitive-sequence signal, outputting the low-pass filtered pixels as the adaptive-filter output.

22. The adaptive filter of claim 21 wherein the means for filtering filters the pixels of the image by averaging a predetermined number of pixels.

23. The adaptive filter of claim 21 wherein the means for identifying disables the repetitive-sequence signal at the beginning of a scan line.

24. The adaptive filter of claim 21 wherein a transition has a sign, and the means for identifying indicates a transition when a difference in luminance between two pixels exceeds a predetermined transition value and a sign of that difference is different from a sign of a previous transition, and the means for identifying identifies a repetitive sequence when at least a predetermined number transitions occur in a sequence of pixels having a predetermined number of pixels.

25. The adaptive filter of claim 21, wherein a transition has a sign, and the means for identifying indicates a transition when a difference in luminance between two adjacent pixels exceeds a predetermined transition value and a sign of that difference is different from a sign of a previous transition, and a sequence of pixels is associated with a respective sequence of transitions, the sequence of transitions having a predetermined number of zones, and the decision circuitry activates the repetitive-sequence signal when each zone has one or more transitions.

26. The adaptive filter of claim 25 wherein the means for identifying deactivates the repetitive-sequence signal when one or more zones have no transitions.

27. The adaptive filter of claim 21 wherein the image is a video image.

* * * * *